Figure 1:
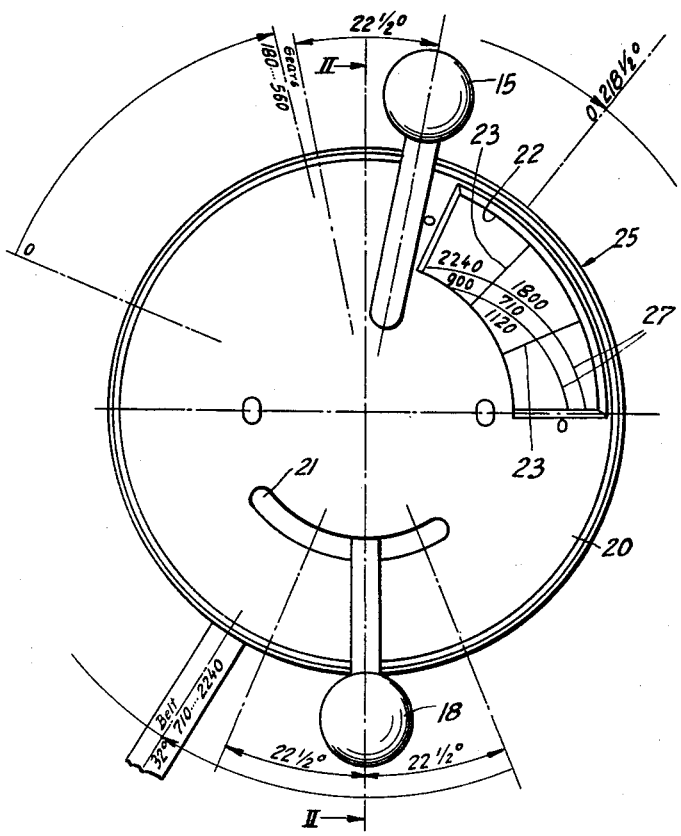

March 22, 1960  H. SCHUMACHER ET AL  2,929,350
SPEED INDICATOR FOR SPEED CHANGE TRANSMISSION, PARTICULARLY
OF TOOL MACHINES Filed Feb. 6, 1958  3 Sheets-Sheet 1

HERMANN SCHUMACHER
HEINRICH WAGENFÜHRER
Inventors

Attorney

HERMANN SCHUMACHER
HEINRICH WAGENFÜHRER
Inventors
Attorney

March 22, 1960
H. SCHUMACHER ET AL
2,929,350
SPEED INDICATOR FOR SPEED CHANGE TRANSMISSION, PARTICULARLY OF TOOL MACHINES
Filed Feb. 6, 1958
3 Sheets-Sheet 3
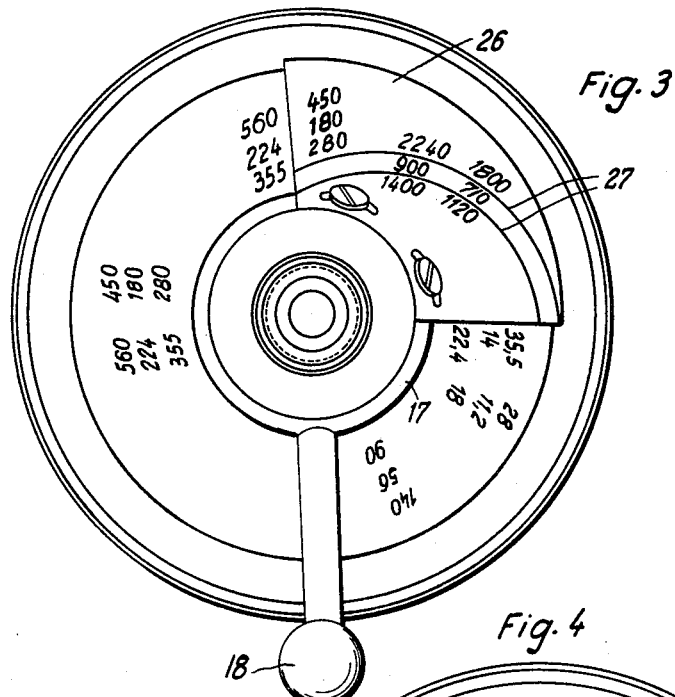
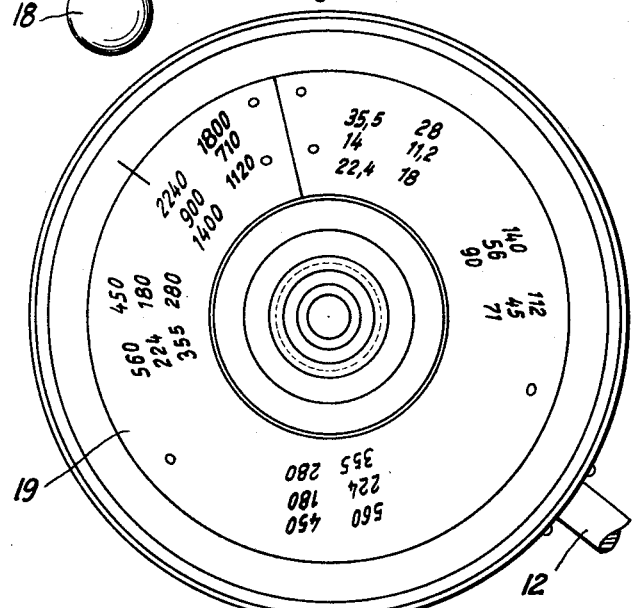
HERMANN SHCUMACHER
HEINRICH WAGENFÜHRER
Inventors
Attorney

United States Patent Office 2,929,350
Patented Mar. 22, 1960

2,929,350

SPEED INDICATOR FOR SPEED CHANGE TRANSMISSION, PARTICULARLY OF TOOL MACHINES

Hermann Schumacher, Goppingen, and Heinrich Wagenfuhrer, Munich, Germany, assignors to Gebr. Boehringer, G.m.b.H., Goppingen-Wuertt, Germany, a German limited liability company Application February 6, 1958, Serial No. 723,933

3 Claims. (Cl. 116—115.5)

Our invention relates to a speed indicator for a speed change transmission settable stepwise to any one of a plurality of speed ratios. Transmissions of this type are composed of a plurality of partial transmissions which are arranged in tandem, each being settable by one of a plurality of independently rotatable coaxial setting members. Such transmissions are used to a considerable extent in machine tools, for instance for driving the work spindles of lathes. Setting up a transmission of this type to a selected speed is a time consuming operation requiring great care on part of the operator.

It is the object of our invention to provide an improved speed indicator which is settable in dependence on the relative angular adjustment of the coaxial setting members and gives a readily discernible visual numerical indication of the number of r.p.m. of the driven shaft of the transmission selected at any time.

More particularly, it is the object of our invention to so construct such speed indicator that it will exhibit not only the speed selected at any time but also a plurality of lower speeds and higher speeds, thereby facilitating the next speed selection by the operator which is liable to involve a speed included in said plurality of speeds.

Further objects of our invention will appear from a detailed description thereof following hereinafter with reference to the accompanying drawings. It is to be understood, however, that our invention is in no way limited to the details of such embodiment but is capable of numerous modifications within the scope of the appended claims and that the terms and phrases used in such detailed description have been chosen for the purpose of illustrating the invention rather than that of restricting or limiting same.

Figure 2:
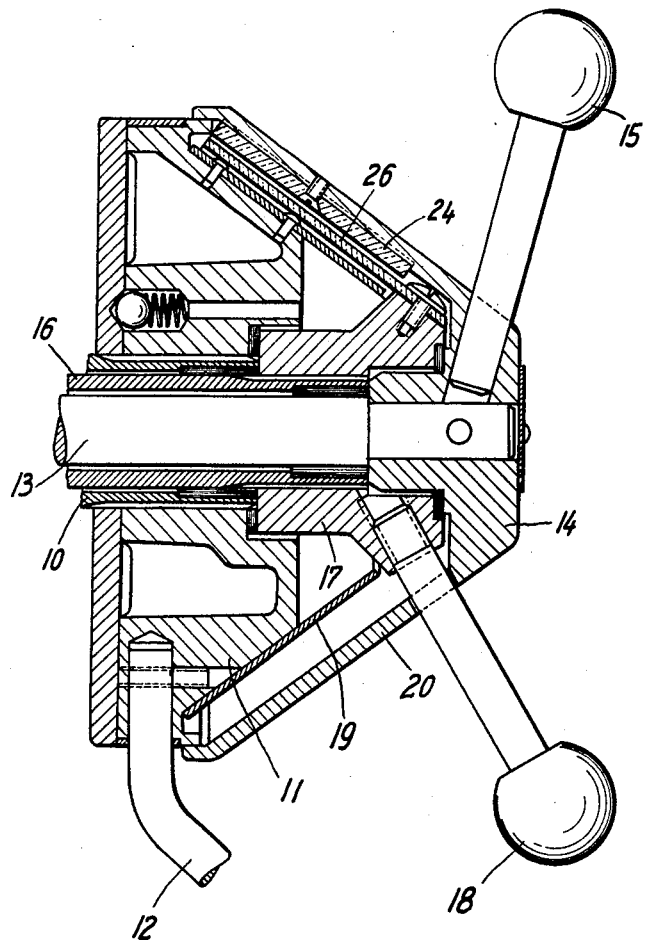

In the drawings:

Fig. 1 is an elevation of the independently rotatable coaxial setting members and of our improved associated speed indicator, Fig. 2 is a sectional view taken along the line II—II shown in Fig. 1, Fig. 3 is a front view of the indicator shown in Fig. 1 upon removal of the second setting member and the first shutter fixed thereto and, Fig. 4 is a front view of the indicator shown in Fig. 1 upon removal of the second setting member and the third setting member and the shutters fixed thereto.

The speed indicator illustrated in the accompanying drawings has been designed for indicating the speed of the work spindle of a lathe, such work spindle being driven by a transmission including three shiftable compound gears constituting three partial transmissions arranged in tandem. The displacement of each compound gear is effected by a rotatable setting member, the three setting members being coaxially disposed and rotatable independently of each other.

Preferably, the coaxial setting members are rotatable shafts disposed in nested relationship. In the embodiment shown the first setting member comprises an outer hollow shaft 10, a hub 11 fixed thereto and a handle 12 fixed to such hub. The second setting member comprises an internal shaft 13, a hub 14 fixed to the end of such shaft and a handle 15 fixed to the hub 14. The third setting member comprises an internal hollow shaft 16, a hub 17 fixed thereto and a handle 18 fixed to the hub 17.

The hub 11 of the first setting member is settable to five different angular positions and is capable in such positions to cause the work spindle of the lathe to be driven at different speeds. Moreover, the hub 11 is settable to intermediary positions and capable, if so set, to shift the transmission to neutral condition. The hub 11 has a conical surface upon which a frustroconical sheet 19 is suitably fixed. This sheet constitutes a dial on which all of the numbers of rotation per minute are recorded in a readily discernible manner illustrated in Fig. 4. These numbers are subdivided in five groups, each group containing a pair of radially extending columns. One of these groups illustrated in Fig. 4 at the right-hand upper corner comprises from the outside to the inside the numbers "1800," "710" and "1120" in the right-hand column and "2240," "900" and "1400" in the left-hand column.

The hub 14 of the second setting member 13 capable of assuming one or the other of two angular positions carries a frustroconical apron 20 provided with an arcuate slot 21 through which handle 18 extends and also provided with a sector-shaped aperture 22. With any angular setting of the setting member 13 at least one of the groups of numbers recorded on the dial 19 will appear in this aperture. A window pane 24 connected to the inside of the apron 20 covers the aperture 22. This window pane is provided with suitable marks identifying the central one of the two groups of figures for a purpose that will be explained later. In the embodiment shown such marks are formed by a pair of spaced radial grooves colored by a suitable paint, such grooves subdividing the aperture 22 into three fields. In Fig. 1 these grooves are indicated at 23. They confine the central field of the window 22. With the setting of the nested shafts shown in the drawings this central field of the aperture 22 exposes the right-hand one of the two above quoted number columns to view such column comprising the numbers "1800," "710" and "1120."

The third setting member 16 settable to any one of three angular positions is connected with a conical sector 26 fixed to the hub 17. This sector is interleaved between the dial 19 of the first setting member and the apron 20 of the second setting member and embraces an angle of a little more than 90°. This sector 26 just as the window pane 24 consists of a transparent material. The sector 26 is provided with spirally shaped marks 27 for selection of one of the figures from the group exposed in the central field of the aperture 22. These spirally shaped marks are formed by substantially equidistant engraved and colored grooves extending obiquely across the aperture 22 in the manner shown in Fig. 1 so as to embrace and thereby select one of the figures of the last mentioned groove. When the setting members are set in the manner shown in the drawings it is the figure 710 that is so selected.

It is evident from the foregoing description that the selected number exposed to view between the spirally shaped marks 27 and between the radial marks 23 will change if at least one of the three setting members is moved to another position. If the operator, for instance, would move the second setting member having the handle 15 in anticlockwise direction through an angle of 22½° to its other position, the dial 19 of the first setting member carrying the indicating numbers and the shutter formed by the sector 26 of the third setting member would retain their positions; the central field 25 of the aperture 22, however, would move to the left with reference to Fig. 1, thereby selecting the column composed of the figures "2240," "900" and "1400." The number "900" would appear within the spiral shutter field confined by the spiral lines 27 of the shutter 26. This would indicate that the transmission has been set to operate the work spindle at a speed of 900 r.p.m.

If the operator, for instance, would leave the first setting member and the second setting member in the position of Fig. 1 and would turn the third setting member by means of its handle 18 in anticlockwise direction through an angle of 22½°, the dial 19 and the aperture 22 would remain in the position shown. The spirally marked shutter, however, would be displaced in such a manner as to embrace the number 1800 between its spiral lines 27 thus indicating that the transmission has been so set as to drive the work spindle at a speed of 1800 r.p.m.

If the operator, for instance, would turn the first setting member only by means of the handle 12 in clockwise direction while the aperture 22 and the spirally marked shutter 26 are left in their positions, the group of numbers appearing in Fig. 4 at the top thereof would be brought into the central position of the aperture 22 and from this group the number "180" would be selected and embraced by the lines 27.

Hence, it will appear that for any possible relative setting of the three handles 12, 15 and 18 a number denoting the selected speed will appear in the central field 25 of the aperture 22 between the spiral marks 27. Because of the conical shape of the apron 20, the front elevation shown in Fig. 1 is viewed at an acute angle with respect to the window pane 24 and this is the reason why the view of the number "1400" in the left-hand column is obstructed by the lower edge of the aperture 22. The operator, however, looking upon the aperture 22 from above will clearly see the number "1400."

The described speed indicator is of compact structure and requires but little space in spite of large setting angles and it will give a very clear indication of the speed selected at any time.

Owing to the display in the aperture 22 not only of the selected speed but of the entire column of numbers and preferably of an adjacent column of numbers the operator may readily select the next speed from the displayed numbers.

The setting of the first setting member 10 by means of the handle 12 is facilitated by the provision at the edge of the hub 11 of a mark cooperating with a graduation provided on the machine frame on which the groups of numbers are indicated.

Some of the speed numbers, such as "450" are displayed twice on the dial 19. That may be explained by the fact that the selection of one of the two numbers "450" will set the transmission so as to drive the spindle through gears only, whereas the selection of the other number "450" will set the transmission in such a position that the spindle is driven through a belt drive for a finishing operation.

From the above description it will be readily appreciated that the operator will save considerable time when using our improved speed indicator for setting up the transmission to any particular speed.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. The combination with a speed change transmission having a plurality of independently rotatable coaxial setting members, of a speed indicator comprising a rotatable annular dial provided with a plurality of circumferentially distributed groups of speed-indicating figures, each group comprising a plurality of speed-indicating figures means rigidly connecting said dial with a first one of said setting members for rotation thereby, a first rotatable annular shutter covering said dial and provided with a window dimensioned for exposing at least one of said groups to view, means rigidly connecting said shutter with a second one of said coaxial setting members for rotation thereby, a second rotatable annular shutter covering said dial and being transparent and having spirally shaped marks for embracing and thereby selecting one of said figures from said one group for view, means rigidly connecting said second annular shutter with a third one of said coaxial setting members, and means mounting said shutters in co-axial and overlying relationship to said dial.

2. The combination claimed in claim 1 in which said coaxial setting members are rotatable shafts disposed in nested relationship, said dial and said shutters being formed by conical sheets one disposed above the other, each conical sheet being fixed to one of said shafts.

3. The combination claimed in claim 1 in which said window of said first shutter is dimensioned to expose a number of adjacent ones of said group of figures and is provided with marks identifying the central one of said groups as being the group cooperating with said spirally shaped marks.

References Cited in the file of this patent

UNITED STATES PATENTS 2,584,360  Montanus _____ Feb. 5, 1952

FOREIGN PATENTS 417,941  Italy _____ Feb. 3, 1947